(12) United States Patent
Maruyama et al.

(10) Patent No.: US 8,350,687 B2
(45) Date of Patent: Jan. 8, 2013

(54) GAUGE DEVICE

(75) Inventors: Yousuke Maruyama, Niigata (JP);
Masaki Yamazoe, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 490 days.

(21) Appl. No.: 12/602,211

(22) PCT Filed: May 26, 2008

(86) PCT No.: PCT/JP2008/059629
§ 371 (c)(1),
(2), (4) Date: Nov. 30, 2009

(87) PCT Pub. No.: WO2008/146777
PCT Pub. Date: Dec. 4, 2008

(65) Prior Publication Data
US 2010/0176938 A1   Jul. 15, 2010

(30) Foreign Application Priority Data

May 30, 2007 (JP) ................................ 2007-144020

(51) Int. Cl.
*B60Q 1/00* (2006.01)
(52) U.S. Cl. ...................... 340/438; 340/441; 340/425.5; 362/23; 362/29
(58) Field of Classification Search .................. 340/438, 340/439, 441, 449, 450, 425.5, 461; 362/23, 362/29, 30; 701/123
See application file for complete search history.

(56) References Cited

U.S. PATENT DOCUMENTS 7,501,939 B1 * 3/2009 Belikov et al. ................ 340/438

FOREIGN PATENT DOCUMENTS

| JP | 54-20558 | 2/1979 |
|----|----------|--------|
| JP | 05-334571 | 12/1993 |
| JP | 07-36397 | 7/1995 |
| JP | 2003-341576 | 12/2003 |
| JP | 2004-245755 | 9/2004 |
| JP | 2005-308895 | 11/2005 |
| JP | 2006-131209 | 5/2006 |
| JP | 2006131209 | * 5/2006 |
| JP | 2007-033366 | 2/2007 |

OTHER PUBLICATIONS

Japanese Office Action issued in Japanese Patent Application No. 2007-144020 dated Feb. 23, 2012

* cited by examiner

*Primary Examiner* — Jennifer Mehmood
*Assistant Examiner* — Hongmin Fan
(74) *Attorney, Agent, or Firm* — McDermott Will & Emery LLP

(57) ABSTRACT

Provided is a gauge device that can provide innovativeness to representation during an operation of effect creation, and can improve the marketability and designability. A gauge device 1 is configured to include a display section 2 that displays vehicle information by rotating a pointer needle on a display panel, and an operation section 3 for use to operate various types of functions of the display section 2. Control means is also provided for operating, in response to an input of a predetermined start signal, in a cooperative manner, first illumination means 2d provided for illuminating the display section 2 and second illumination means 3c provided for illuminating the operation section 3 to make those operate a predetermined operation of effect creation. The start signal is an input of turning on or off a power switch.

6 Claims, 4 Drawing Sheets

GAUGE DEVICE

RELATED APPLICATIONS

This application is the U.S. National Phase under 35 U.S.C. §371 of International Application No. PCT/JP2008/059629, filed on May 26, 2008, which in turn claims the benefit of Japanese Application No. 2007-144020, filed on May 30, 2007, the disclosures of which Applications are incorporated by reference herein.

TECHNICAL FIELD

The present invention relates to a gauge device that indicates information of a vehicle by rotating a pointer needle on a display panel.

BACKGROUND ART

A gauge device for displaying various types of information of a vehicle (hereinafter, referred to as vehicle information) such as vehicle speed, engine RPM (Revolutions Per Minute), water temperature, and oil pressure, is known to include a gauge of a pointer needle display type. The gauge has a drive body attached with a pointer needle, and the pointer needle is rotated on a display panel to display a measurement amount indicating the vehicle information, for example. Such a gauge device includes a combination meter whose case accommodates therein a speed meter, a tachometer, and a fuel meter, a so-called additional meter whose case accommodates therein a single analog gauge body, and monitors the vehicle information separately from the combination meter, and others.

Such a gauge device is expected to be innovative in design. The current one is known to operate to create the effects different from display of the vehicle information (no-display operation) in response to an input of turning on or off an ignition switch (power switch) of the vehicle. This operation of effect creation is exemplified by rotating the pointer needle from the zero position to the highest-value position along the scales of the display panel, and then returning the pointer needle back to the zero position, or by turning on illumination light sources provided specifically respectively to the pointer needle and the display panel at different timings to turn on the illumination light sources in accordance with the on-state of the IGN switch. Such a gauge device is described in Patent Document 1, for example.

Patent Document: JP-A-2004-245755

DISCLOSURE OF THE INVENTION

Problems that the Invention is to Solve

The additional meter described above is sometimes provided with an operation switch (operation section) for operating various types of functions. However, even with a configuration of including illumination means unique to the operation switch, the operation switch will not be used to the above-described operation of effect creation, and there thus is susceptible to more improvement as the method of representation using the illumination to provide innovativeness.

As such, the invention is proposed in consideration of the problems described above, and an object thereof is to provide a gauge device that can achieve the innovative representation by the operation of effect creation, and can improve the marketability and designability.

Means for Solving the Problems

In order to solve the problems described above, the present invention is directed to a gauge device provided with a display section that displays vehicle information by rotating a pointer needle on a display panel, and an operation section for use to operate various types of functions of the display section. The gauge device is characterized in including control means that operates, in response to an input of a predetermined start signal, in a cooperative manner, first illumination means for illuminating the display section, and second illumination means for illuminating the operation section to make those go through a predetermined operation of effect creation.

The control means is characterized in making the first and second illumination means flash on and off as the operation of effect creation.

The control means is also characterized in reducing, by degrees, the time of turning on the first and second illumination means being flashed on and off during the operation of effect creation.

The control means is also characterized in turning on or off the first and second illumination means in a predetermined order as the operation of effect creation.

The start signal is characterized as being an input of turning on or off a power switch.

Moreover, the first illumination means is characterized in illuminating at least either the pointer needle or the display panel.

Advantage of the Invention

The present invention is related to a gauge device that indicates vehicle information by rotating a pointer needle on a display panel, and with such a gauge device, representation during an operation of effect creation can be provided with innovativeness, and the marketability and designability can be accordingly improved.

Figure 1:
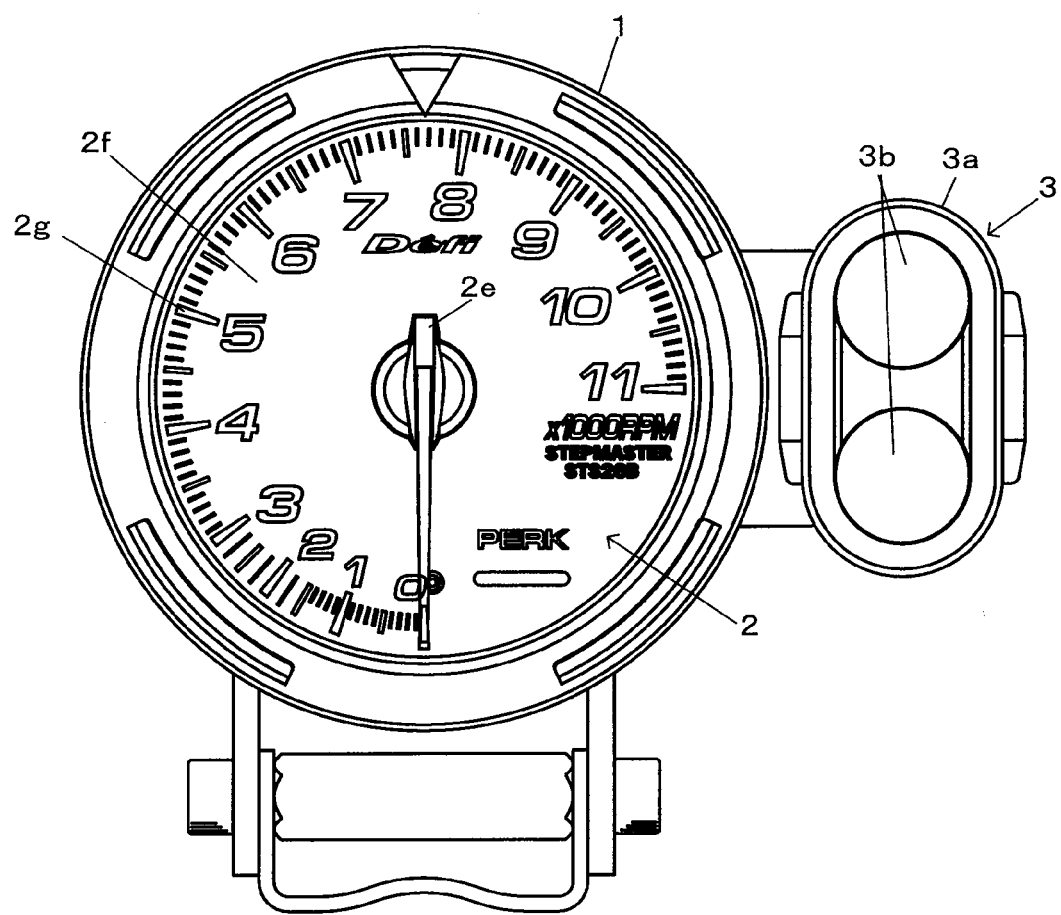
FIG. 1 is a diagram showing a gauge device of an embodiment of the invention.

DESCRIPTION OF REFERENCE NUMERALS AND SIGNS 2 display section
2a drive body
2c pointer needle illumination means (first illumination means)
2d display panel illumination means (first illumination means)
3 operation section
3b pushbutton switch
3c operation section illumination means (second illumination means)
5 IGN detection means
6 control means

BEST MODE FOR CARRYING OUT THE INVENTION

In the below, by referring to the accompanying drawings, described is an embodiment in which the invention is applied to an additional meter whose case accommodates therein a single analog gauge.

Figure 2:
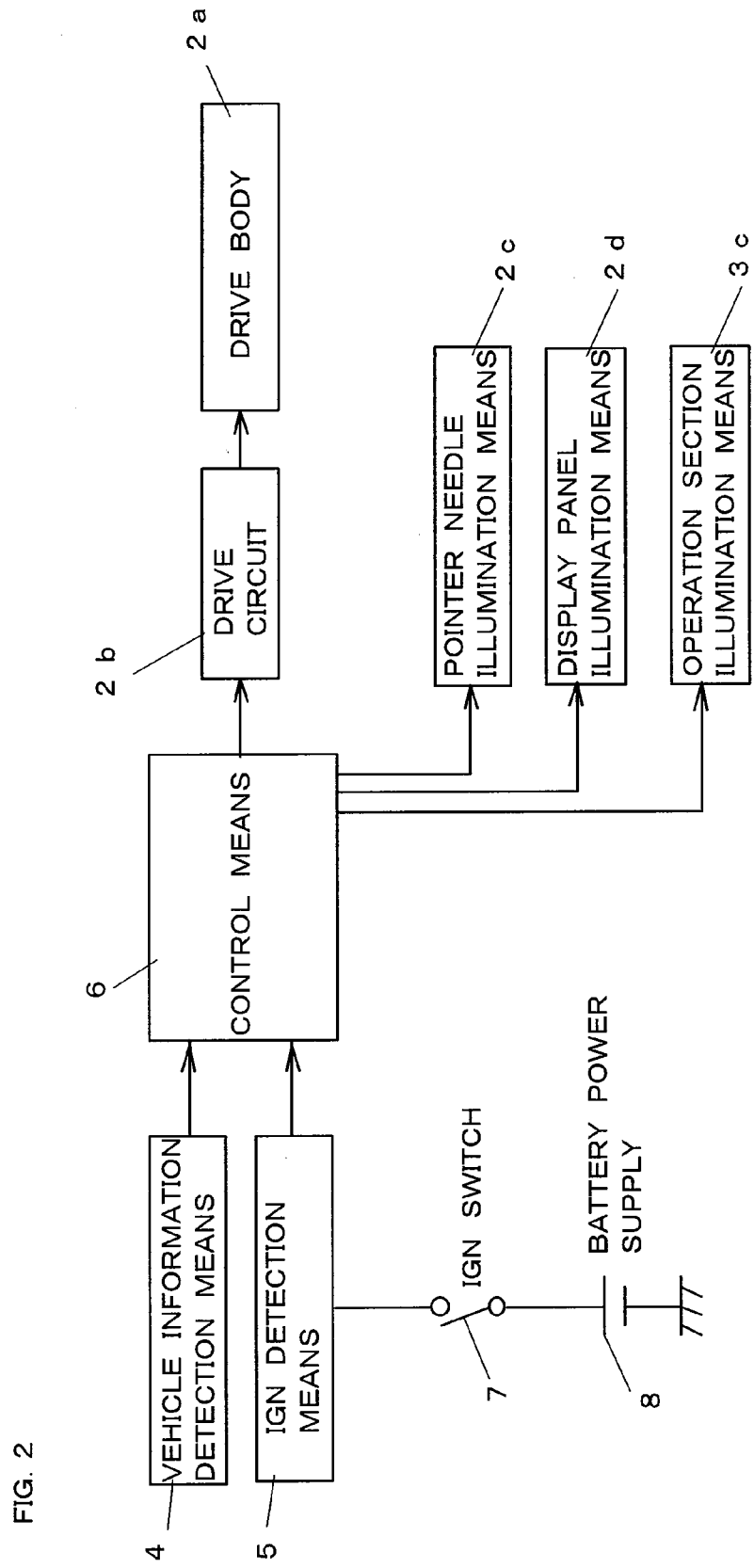
FIG. 2 is a diagram showing an electrical configuration of the device above.

By referring to FIGS. 1 and 2, the entire configuration of a gauge device is described. The gauge device is mainly configured to include a case body 1, a display section 2, an operation section 3, vehicle information detection means 4, IGN (ignition) detection means 5, and control means 6.

The case body 1 is made of a resinous material, for example, and accommodates therein the display section 2 including an electrical configuration component(s). Note here that the front surface side of the case body 1 is covered by a light-transmissive cover element that is not shown.

The display section 2 includes a drive body 2a configured by a stepping motor, a drive circuit 2b for use to drive the drive body 2a, and pointer needle illumination means 2c and display panel illumination means 2d that are both provided as first illumination means for illuminating the display section 2, and are respectively formed by groups of a plurality of light-emitting diodes (LED). In the display section 2, the drive body 2a is attached with a pointer needle 2e via a rotation shaft (not shown), and a display panel 2f disposed behind the needle pointer 2e is formed with a display indicator 2g such as scales and numeric characters, thereby showing any change occurred in the vehicle information by reading the display indicator in comparison with the pointer needle 2e. Note that, in the embodiment, the display section 2 serves to indicate the engine RPM of the vehicle as the vehicle information. Herein, the pointer needle 2e and the display panel 2f are those to be illuminated respectively by the pointer needle illumination means 2c and the display panel illumination means 2d. By the illumination light from the pointer needle illumination means 2c, an indicator section of the pointer needle 2e is illuminated bright, and by the illumination light from the display panel illumination means 2d, the display indicator 2g is illuminated by transmission of light.

The operation section 3 is configured by a switch case 3a made of a resin material such as ABS including therein a plurality of pushbutton switches (operation switches) 3b, and is provided separately from the display section 2 to serve to change or determine various types of functions of the gauge device. The operation section 3 is also provided with operation section illumination means 3c, which serves as second illumination means for illuminating the pushbutton switches 3b. The operation section illumination means 3c is configured by a plurality of light-emitting element similarly to the first illumination means, and is used to illuminate bright the pushbutton switches 3b.

The vehicle information detection means 4 is provided for detecting the vehicle information, and in this embodiment, is configured by a TA pulse indicating the engine RPM of the vehicle.

The IGN detection means 5 is provided for detecting any state change of the IGN switch 7 of the vehicle from off to on and from on to off, and when detecting that the IGN switch 7 is in the on state or the off state, forwards each corresponding detection signal to the control means 6. Note that the ON state of the IGN switch 7 may be any of the follows: change to the on state of an accessory power supply from the off state of the IGN switch 7, change to the on state of engine start from the off state of the IGN switch 7, or change to the on state of engine start from the on state of the accessory power supply. Herein, the IGN switch 7 is connected, at one end, with a battery power supply 8 of the vehicle, and the other end thereof is connected to the IGN detection means 5.

The control means 6 is configured by a microcomputer provided with a CPU, a ROM, a RAM, an input/output interface, and others. The control means 6 serves to input a state signal from the vehicle information detection means 4, finds measurement data about the vehicle information based on the state signal by any predetermined computation process, drive the drive body 2a by forwarding a drive signal in accordance with the measurement data to the drive body 2a at predetermined intervals via the drive circuit 2b, and rotate to operate the pointer needle 2e attached to the device body 2a. The control means 6 is also has an initial operation function that will be described in detail later for making the display section (operation of effect creation) 2 to go through an initial operation different from the operation of displaying the vehicle information when receiving a detection signal from the IGN detection means 5 as a predetermined start signal indicating that the IGN switch 7 is now turned on.

Such components configure the gauge device. Next, by referring to FIG. 3, described is the initial operation function of the control means 6 in the gauge device. Note here that, in the display section 2, the pointer needle 2e is assumed as being allowed to cover an indicator angle of 0° to 270°, and the starting point of the pointer needle 2e is assumed at the position of the minimum scale.

When detecting that the IGN switch 7 is in the ON state (input of ON) via the IGN detection means 5 as the start signal, the control means 6 forwards a drive signal to each of the drive body 2a, the pointer needle illumination means 2c, the display panel illumination means 2d, and the operation section illumination means 3c to make those go through the initial operation in a cooperative manner.

Figure 3:
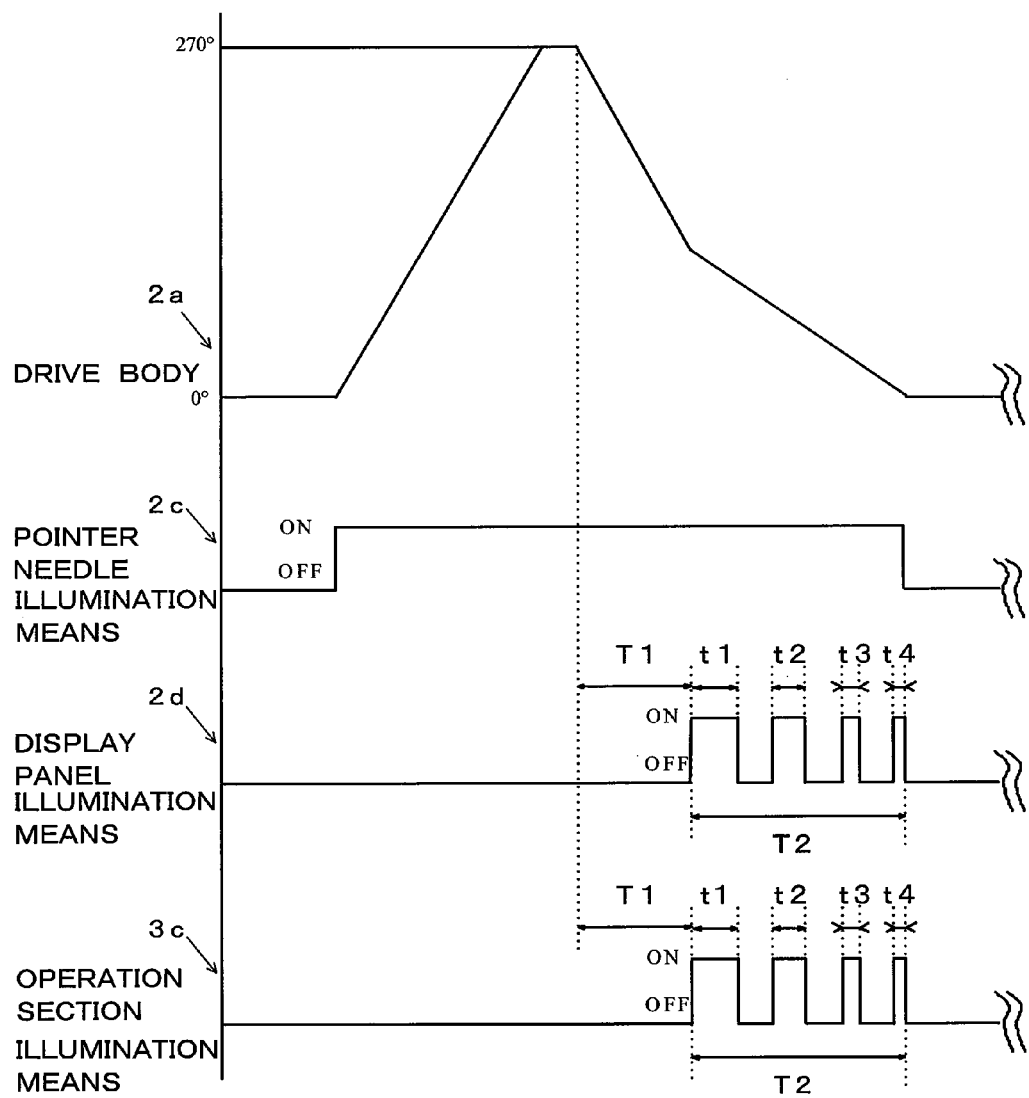
FIG. 3 is a diagram showing a processing method of control means in the device above.

FIG. 3 is a timing chart showing a method of controlling the drive body 2, the pointer needle illumination means 2c, the display panel illumination means 2c, and the operation section illumination means 3c during the initial operation. During the initial operation, the control means 6 turns on the pointer needle illumination means 2c provided for illuminating the pointer needle 2e at the maximum brightness, and forwards a drive signal to the drive body 2a of the display section 2, thereby starting to rotate the pointer needle 2e attached to the drive body 2a from the position of the minimum scale (indicator angle of 0°) toward the direction of the maximum scale in the display indicator 2g. With the lapse of a predetermined length of time after the pointer needle 2e reaching the position of the maximum scale (indicator angle of 270°), the control means 6 rotates the pointer needle 2e in the direction of the minimum scale in the display indicator 2g. With the lapse of a time of T1 after the pointer needle 2e is started to rotate in the direction of the minimum scale, the control means 6 repeatedly flashes on and off the display panel illumination means 2d provided for illuminating the display panel 2f and the operation section illumination means 3c provided for illuminating the operation section 3 by alternately turning those on and off repeatedly at the maximum brightness during a time of T2. At this time, the control means 6 executes a process of reducing, by degrees, turn-on times t1 to t4 of the display panel illumination means 2d and those of the operation section illumination means 3c being flashed on and off (t1>t2>t3>t4). Herein, the turn-off time of the illumination means 2d and that of the illumination means 3c are both fixed. The control means 6 controls the drive body 2a in such a manner as to bring the pointer needle 2e at the position of the minimum scale, and after a wait for the pointer needle 2e to reach the position of the minimum scale, turns off the illumination means 2c, 2d, and 3c. The initial operation is thus ended, and the procedure goes to the operation of displaying the vehicle information.

By such a process being executed by the control means 6, the gauge device 1 enables to rotate the pointer needle 2e within a predetermined angle range during the initial operation, and to operate the display panel 2f and the pushbutton switches 3b to momentarily flash with intensity like a lightning with "sparks" of light by operating, in a cooperative manner, the display panel illumination means 2d being the first illumination means and the operation section illumination means 3c being the second illumination means.

Figure 4:
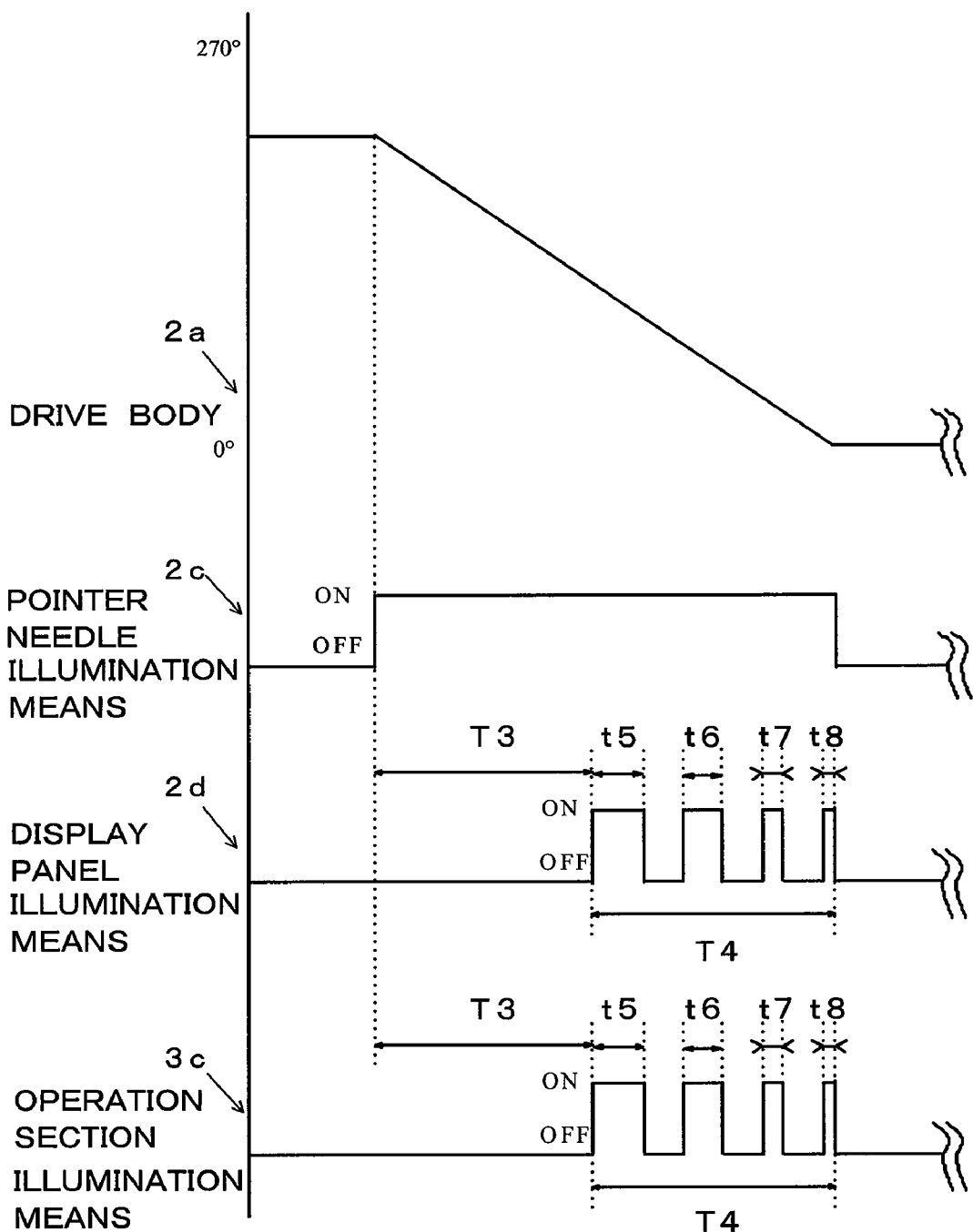
FIG. 4 is a diagram showing another processing method of the control means in the device above.

Herein, as to the operation of effect creation in the embodiment, an end operation may be executed in response to an input of turning off the IGN switch 7 being a start signal. FIG. 4 is a timing chart showing an exemplary method of controlling the drive body 2a, the pointer needle illumination means 2c, the display panel illumination means 2d, and the operation section illumination means 3c during such an end operation.

When detecting that the IGN switch 7 is in the OFF state (input of OFF) as the start signal via the IGN detection means 5, the control means 6 forwards a drive signal to each of the drive body 2a, the pointer needle illumination means 2c, the display panel illumination means 2d, and the operation section illumination means 3c to make those go through the end operation in a cooperative manner.

As shown in FIG. 4, during the end operation, the control means 6 turns on the pointer needle illumination means 2c provided for illuminating the pointer needle 2e at the maximum brightness, and forwards a drive signal to the drive body 2a of the display section 2, thereby starting to rotate the pointer needle 2e from the current indicator position displayed by the vehicle information toward the direction of the minimum scale in the display indicator 2g. With the lapse of a time of T3 after the pointer needle 2e is started to rotate in the direction of the minimum scale, the control means 6 flashes on and off the display panel illumination means 2d provided for illuminating the display panel 2f and the operation section illumination means 3c provided for illuminating the operation section 3 at the maximum brightness during a time of T4. At this time, the control means 6 executes a process of reducing, by degrees, turn-on times t5 to t8 of the display panel illumination means 2d and those of the operation section illumination means 3c (t5>t6>t7>t8). Herein, the turn-off time of the illumination means 2d and that of the illumination means 3c are both fixed. The control means 6 then controls the drive body 2a in such a manner as to bring the pointer needle 2e at the position of the minimum scale (indicator angle of 0°), and after a wait for the pointer needle 2e to reach the position of the minimum scale, turns off the illumination means 2c, 2d, and 3c. The end operation is thus ended, and the gauge device is stopped.

With such a process being executed by the control means 6, the gauge device 1 enables to rotate the pointer needle 2e within a predetermined angle range also during the end operation, and to operate the display panel 3f to momentarily flash with intensity like a lightning with "sparks" of light.

Such a gauge device is for operating, by the control means 6, the first illumination means provided for illuminating the display section 2 and the second illumination means for illuminating the operation section 3 in a cooperative manner, thereby leading to any predetermined operation of creating effects (initial operation or end operation). Moreover, as such an operation of effect creation, in response to an input of a predetermined start signal, the display panel illumination means 2d provided for illuminating the display panel 2f and the operation section illumination means 3c provided for illuminating the operation section 3 are flashed on an off during a predetermined length of time T2 or T4, and the turn-on times t1 to t4 or t5 to t8 of the second illumination means 3d during such flashing are reduced by degrees. The start signal is the one serving as an input to turn on or off the IGN switch 7.

Accordingly, such a gauge device operates, in a cooperative manner, not only the first illumination means previously provided for illuminating the display section 2, i.e., the pointer needle illumination means 2c and the display panel illumination means 2d, but also the operation section illumination means 3c provided for illuminating the operation section 3 to make those operate to create the effects, the resulting effects can derive the feel of integration among the components provided to the gauge device, and the representation during the operation of effect creation can be provided with innovativeness, thereby being able to improve the marketability and design ability.

Moreover, such a gauge device enables to, during the operation of effect creation, operate the display panel 2f and the pushbutton switches 3b to momentarily flash with intensity like a lightning with "sparks" of light so that the representation during the operation of effect creation can be provided with innovativeness, thereby being able to improve the marketability and design ability to a further degree. Note here that such representation of illumination can be implemented with the characteristics of reducing by degrees of the turn-on time during the flashing, and the resulting representation can more clearly catch a user's attention, and can be innovative by being able to additionally provide the lingering light after flashing. Such representation of illumination is also recognized as being totally different from flashing by simply alternately repeating the change of state from on and off at fixed time intervals.

Note that the invention is surely not restricted to the embodiment described above and the invention can be applied to a demonstration operation of a rotation operation within a predetermined angle range specifically for exhibition, for example.

Further, in the embodiment, the display panel illumination means 2d provided for illuminating the display panel 2f is specifically flashed on and off in the first illumination means, but alternatively, in the invention, the pointer needle illumination means 2c provided for illuminating the pointer needle 2e may be flashed on and off together with the operation section illumination means 3c.

Still further, the operation of effect creation described above as operating the first and second illumination means in a cooperative manner is surely not restricted to the embodiment, and alternatively, the pointer needle illumination means 2c, the display panel illumination means 2d, and the operation section illumination means 3c may be turned on or off in a predetermined order with a time difference.

INDUSTRIAL APPLICABILITY

It is considered suitable to a gauge device that displays vehicle information by rotating a pointer needle on a display panel.

The invention claimed is:
1. A gauge device comprising:
a display section that displays vehicle information by rotating a pointer needle on a display panel;

an operation section for use to operate various types of functions of the display section; and control means that controls, in response to a start signal, a drive body to rotate the pointer needle from a position of a maximum scale or a current indicator position toward a direction of a minimum scale in a display indicator of the display panel, and control, in a cooperative manner, first illumination means for illuminating the display section and second illumination means for illuminating the operation section to perform an operation of effect creation after the pointer needle starts rotating in the direction of the minimum scale.

2. The gauge device according to claim 1, wherein the control means makes the first and second illumination means flash on and off as the operation of effect creation.

3. The gauge device according to claim 2, wherein the control means reduces, by degrees, the time of turning on the first and second illumination means being flashed on and off during the operation of effect creation.

4. The gauge device according to claim 1, wherein the control means turns on or off the first and second illumination means in a predetermined order as the operation of effect creation.

5. The gauge device according to claim 1, wherein the start signal is an input of turning on or off a power switch.

6. The gauge device according to claim 1, wherein the first illumination means illuminates at least one of the pointer needle and the display panel.

* * * * *